United States Patent [19]
Vaughan

[11] 3,841,365
[45] Oct. 15, 1974

[54] UNITARY RESILIENT SEALING VALVE

[75] Inventor: Harry L. Vaughan, Lawrenceville, Ga.

[73] Assignee: Scripto, Inc., Atlanta, Ga.

[22] Filed: Nov. 29, 1972

[21] Appl. No.: 310,395

Related U.S. Application Data

[62] Division of Ser. No. 89,257, Nov. 13, 1970, abandoned.

[52] U.S. Cl. .............................. 141/291, 141/348
[51] Int. Cl. ........................... B65b 3/04, B67c 3/02
[58] Field of Search ................... 141/285, 291–296, 141/301, 302, 348–362; 251/7, 339, 342, 353

[56] References Cited
UNITED STATES PATENTS
3,085,601   4/1963   Zellweger ........................... 141/348

*Primary Examiner*—Houston S. Bell, Jr.
*Attorney, Agent, or Firm*—Newton, Hopkins & Ormsby

[57] ABSTRACT

A unit having a reservoir for containing a supply of fuel, a valve assembly associated with the reservoir to provide selective communication between the internal portion of the reservoir and the exterior portion of the unit, the valve assembly including an aperture formed therethrough, a valve seat disposed adjacent the aperture, and a valve member that normally is in sealing engagement with the valve seat, the valve member being of an elastic material which, when subject to deformation through an applied force, is separated from the valve seat to allow passage of fuel through the aperture.

8 Claims, 8 Drawing Figures

PATENTED OCT 15 1974  3,841,365
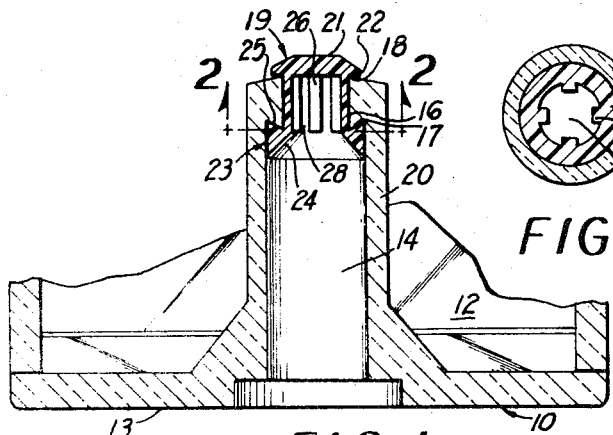
FIG 1
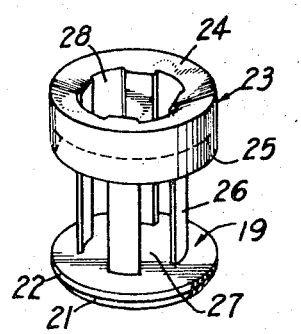
FIG 2
FIG 3
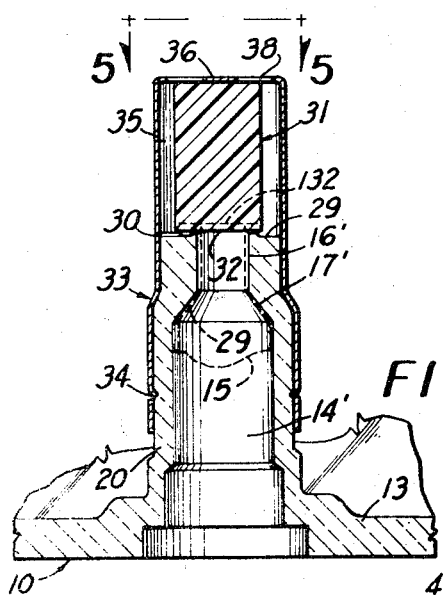
FIG 4
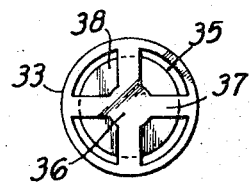
FIG 5
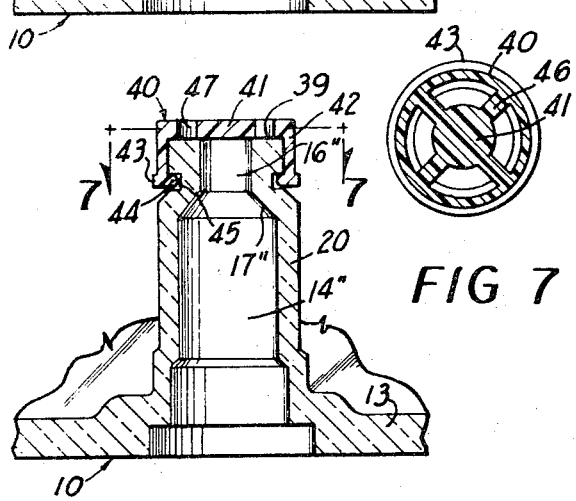
FIG 6
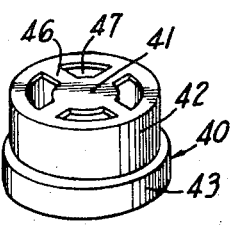
FIG 7
FIG 8

UNITARY RESILIENT SEALING VALVE

This is a division, of application Ser. No. 89,257, filed 11/13/70, now abandoned.

BACKGROUND OF THE INVENTION

The present invention relates to improvements in lighters and more particularly to a valve for a lighter with a unitary sealing means.

Fill valves used in previous lighters are commonly comprised of a poppet member, sealing disk and separate support means. Other variations include ball members and piercing needles. All these embodiments entail serveral coacting parts which not only require meticulous assembly but also increase the possiblity of improper operation due to the multiplicity of mating surfaces and variations in tolerances of manufacture.

CROSS-REFERENCES TO RELATED APPLICATIONS

This is a division of U.S. Pat. application Ser. No. 89,257 filed Nov. 13, 1970, which was abandoned after the filing of a continuation application Ser. No. 310,396 filed Nov. 29, 1972, which application is presently copending.

SUMMARY OF THE INVENTION

This invention relates to a unitary, resilient valve member which is normally in sealing engagement with a valve seat, but is subject to deformation through an applied force to allow a gas to pass therethrough and when the force is removed to return again into sealing engagement.

It is an object of this invention to provide a resilient unitary fill valve means in a lighter having a reservoir which is adapted to receive a charging apparatus that stretches the valve means to allow gas to flow into the reservoir with the valve means assuming its sealing engagement when the charging apparatus is removed.

It is a further object of this invention to provide a number of embodiments of a unitary resilient valve means.

It is another object of this invention to provide a valve means for a lighter which eliminates the need for a plurality of co-acting parts.

Another object of the present invention is to provide a fill valve means which is unitary, simple in construction, economical to manufacture and reliable in operation.

Still other objects and advantages of the present invention will become apparent after reading the accompanying description of the selected illustrative embodiments of the invention with reference to the attached drawings wherein like reference characters have been used to refer to the like parts throughout the figures of drawings, and wherein:

BRIEF DESCRIPTION OF THE DRAWINGS

FIG. 1 is a cross-sectional side elevation showing a first embodiment of the present invention;

FIG. 2 is a cross-section of FIG. 1 along lines 2—2 in FIG. 1;

FIG. 3 is a perspective view of the sealing member shown in FIG. 1;

FIG. 4 is a side elevation in section of a second embodiment of the present invention;

FIG. 5 is an end view of the embodiment of FIG. 4 taken along lines 5—5 in FIG. 4;

FIG. 6 is a cross-sectional side elevation of a third embodiment of the present invention;

FIG. 7 is a section taken along line 7—7 in FIG. 6; and,

FIG. 8 is a perspective view of the sealing member of the embodiment shown in FIG. 6.

DESCRIPTION OF THE ILLUSTRATIVE EMBODIMENTS

Referring in detail to the embodiments chosen for the purpose of illustrating the present invention, numeral 10 denotes generally the lighter as shown in FIGS. 1, 4 and 6.

The lighter 10 includes a reservoir 12 fixedly attached to a fill port body 13 having a forwardly projecting tubular portion 20 and an internal bore 14 designed to accept a charging apparatus 15 partially delineated by dotted lines in FIG. 4. At the forward end of bore 14 of fill port body 13 is a reduced diameter section 16, the transition between bore 14 and bore 16 being a counterbore ledge portion 17 in the embodiment of FIG. 1 and a chamfer 17' and 17'' in the embodiments of FIG. 4 and FIG. 6 to be discussed later in detail. The forward end of fill port body 13 terminates in a seal surface 18 which is substantially transverse to the forward bore 16.

Referring to FIG. 1, positioned into the forward bore 16 is a resilient sealing member 19 which is introduced through the larger bore 14 in the embodiment shown in FIG. 1 and compressed through reduced diameter bore 16 until snapped into place.

Referring now to FIG. 3, which depicts sealing member 19 in an inverted position, the resilient sealing member 19 is composed of a poppet head 21 having a sealing surface 22 which contacts the corresponding sealing surface 18 shown in FIG. 1. Disposed beneath the sealing surface 22 is a base ring 23. Ring 23 has a chamfered diametral bottom surface 24 which cooperates with the chamfer portion 29 on the charging apparatus 15 (shown in FIG. 4) to effectively form a seal during fuel transfer to prevent leakage of fuel outside of the reservoir 12. Further, the base ring 23 has a forwardly projecting flange 25 which fits into the counterbore ledge portion 17 to prevent any forward motion of the base ring 23 portion of sealing member 19 in respect to the fill port body 13 when the charging apparatus 15 is inserted into bore 14. Base ring 23 has an internal bore 28 and is connected to the sealing surface 22 by means of a plurality of longitudinal posts 26 having ports 27 between each adjacent pair. The posts 26 are circumferentially connected to the top of the base ring 23 and to the bottom of the sealing surface 22. The length of the posts 26 is such that, upon assembly to fill port body 13, they are stretched sufficiently to achieve a positive pressure between the sealing surface 22 of sealing member 19 and the sealing surface 18 of the fill port body 13. This insures that no leakage of the fuel can occur from the reservoir 12 into the bore 14 and out to the atmosphere.

Upon introduction of the charging apparatus 15 (shown in FIG. 4) into the bore 14, the forward diameter portion of the charging apparatus projects through bore 28 and abuts the bottom of the sealing surface 22 of resilient member 19. Since the forward portion of the charging apparatus 15 is longer than the depth of the bore 28 of sealing member 19, the sealing surface 22 of the sealing member 19 is urged upward away from the sealing surface 18 of the fill port body 13. At the same time, the chamfer 29 of the charging apparatus 15 moves into sealing relationship with the chamfered bore portion 24 of the resilient seal member 19 so that no fuel can escape to the atmosphere. Since the sealing surface 22 of sealing member 19 has now been lifted away from the corresponding sealing surface 18 of the fill port body 13 further extending resilient posts 26, fuel may be introduced through a central bore of the charging apparatus 15 and then radially out through a groove in the forward end of the charging apparatus 15 (neither bore nor groove are shown) and subsequently move through the ports 27 of the sealing member 19 and into the reservoir section 12 of the lighter 10. Upon extraction of the charging apparatus 15 from the bore 28 of the sealing member 19, the extended posts 26 immediately contract to force poppet head 21 and sealing surface 22 back into sealing relationship with the forward seal surface 18 of the fill port body 13.

In the second embodiment shown in FIG. 4, the lighter 10 has a base or fill port body 13 as before, having a forwardly projecting tubular portion 20, and an internal bore 14' designed to accept the charging apparatus 15. A reduced diameter bore portion 16' terminates in a transverse sealing wall 29, the transition between bore 14' and bore 16' being chamfer portion 17'. Extending around the periphery of the sealing wall 29 adjacent the bore 16' is an upwardly projecting annular ring 30. Forward of the wall 29 is mounted plug member 31 whose flat, rearwardly facing end wall 32 is in sealing relationship to ring 30 of the sealing wall 29. Plug 31 is a solid, cylindrical element having a flat top surface 38. Plug 31 is supported on ring 30 by sleeve 33 whose forward portion contains plug 31 and whose rearward portion is fitted onto the fill port structure 20. Sleeve 33 is held in fixed relationship to fill port structure 20 by means of staking or dimpling shown at 34. The diameter of plug 31 is less than the inner diameter of the forward portion of the sleeve 33, thus forming an annular space 35 between the plug 29 and the sleeve 33. The top of the sleeve 33 is a circular wall 36 which is of a smaller diameter than plug 31. The wall 36 is connected to the sleeve by a plurality of slats 37. A space is formed between each adjacent pair of slats 37. The wall 36 is in engagement with the top surface 38 of the plug 31. The wall 36 serves to uprightly support plug 31 with a slight compression to insure sealing relationship of its opposite face or wall 32 with the ring 30.

Upon introduction of the charging apparatus 15 into the bore 16', the forward end of the charging apparatus 15 contacts the wall 32 of plug 31 and urges it upwardly away from ring 30 and the surface 29 to position 132. Fuel can now flow through the bore (not shown) of the charging apparatus 15 and radially outward through a notch (not shown) in the forward end of the charging apparatus 15, thence through the space now established between ring 30, wall 29, and bottom wall 132, then through the annular space 35 between the outer diameter of the plug 31 and the inner diameter of the sleeve 33, and finally through the holes between the slats 37 into the reservoir 12 proper. Extraction of the charging apparatus 15 allows the compressed plug 31 to immediately re-establish the seal between its end wall 32 and the ring 30 and so effect a seal between the reservoir 12 and the atmosphere to preclude loss of fuel from the reservoir 12.

In the third embodiment of the invention shown in FIG. 6, again the basic structure of the lighter 10 consists of a fill port body 13 having a forwardly extending tubular body portion 20, an internal bore 14'' adapted to accept a charging apparatus shown as 15 in FIG. 4, a reduced diameter portion 16'' and an end sealing surface 39 adjacent the bore 16'', the transition between bore 14'' and bore 16'' being chamfer portion 17'''. Surrounding the end of the fill port structure is a cap-shaped resilient valve means 40 having a top wall 41, a circumferential body portion 42 fitted annually outside the forward most portion of fill port tubular body portion 20 and a base ring 43 with a radial inwardly extending flange 44 on the rearward end of valve means 40 fitted into a corresponding circumferential groove 45 in tubular body portion 20. The top wall 41 is a circular member with a slightly larger diameter than the bore 16'' so that the wall 41 is in sealing engagement with the sealing surface 39. The wall 41 is connected to the valve means 40 by a plurality of slats 46 forming passageways 47 between adjacent slats 46. The length of the body portion 42 of valve means 40 is slightly shorter than the distance from groove 45 to sealing surface 39 of tubular body part 20, thereby effecting extension of resilient valve means 40 and insuring sealing of top wall 41 with the surface 39.

Upon introduction of the charging apparatus into bore 16'' as described in the prior two embodiments, the top wall 41 is separated from the sealing surface 39. A space is thus established therebetween to allow the flow of fuel through the charging apparatus 15 through this space, thence through the passageways 47 and into the interior of the reservoir 12 to effect recharging of the lighter 10 with fuel. Extraction of the charging apparatus 15 from the bore 16'' of the fill port body 13 allows the extended circumferential wall 42 to contract top wall 41 back into sealing relationship with surface 39 and thereby prevent escape of the fuel in the reservoir 12 to the atmosphere.

A valve with a unitary resilient sealing means as described herein may also be used in the burner valve assembly of a lighter to allow flow of fuel from the reservoir to the atmosphere for burning. The present invention can also be used in the charging apparatus itself, allowing fuel to be communicated between the interior of the apparatus through its internal bore to its exterior.

The two valve member embodiments 19 and 40 can be manufactured from any suitable resilient material, preferably injection-molded polyurethane plastic. In the other valve member embodiment shown in FIGS. 4 and 5, the sleeve 33 is constructed from any non-resilient material such as a metal. The plug 31 is constructed of a deformable substance such as polyurethane.

The present invention may be modified in the details of the construction without departing from the inventive concept which is set out in varying scope in the appended claims.

What is claimed:

1. A fill valve for a lighter having a reservoir for containing a supply of fuel therein, a fill port communicating with said reservoir and adapted to receive a charging apparatus therein for introducing fuel into said reservoir, a valve means associated with said fill port, said valve means including a sleeve fixedly disposed about the inner end of said fill port and having an opening therein, and a flexible and resilient plug member disposed within said sleeve in spaced relationship and normally in sealing contact with the inner end of said fill port said resilient plug being flexed out of sealing contact with the inner end of the fill port upon inserting of the charging apparatus so as to allow introduction of fuel into the reservoir along the path connecting the inner end of said fill port and the spacing between the plug and the sleeve and the sleeve opening.

2. A fill valve means as claimed in claim 1 and further characterized in that said fill port includes a projecting tubular portion, a first internal bore, a second internal bore, a chamfered portion joining said first and second bores, a sealing surface disposed adjacent the inner extremity of said second bore, and an inwardly projecting annular ring positioned at the inner periphery of said surface adjacent said second bore.

3. A fill valve means as claimed in claim 2 and further characterized in that said second bore is of a smaller diameter than said first bore.

4. A fill valve means as claimed in claim 1 and further characterized in that said resilient plug member is solid and cylindrical in shape having a flat bottom wall and a flat top wall.

5. A fill valve means as claimed in claim 4 and further characterized in that said plug is of a larger diameter than said second bore.

6. A fill valve means as claimed in claim 1 and further characterized in that one end of said sleeve includes a end wall portion and a plurality of slats connecting said end wall portion with said sleeve so as to provide an opening between each adjacent pair of said slats.

7. A fill valve means as claimed in claim 6 and further characterized in that said end wall portion is of a circular configuration and of a smaller diameter than said plug member.

8. A fill valve means as claimed in claim 6 and further characterized in that said wall portion of said sleeve slightly compresses said plug member to insure a sealing engagement with said fill port.

* * * * *